United States Patent [19]

Hildenbrand

[11] 4,154,329
[45] May 15, 1979

[54] MECHANISM FOR FEEDING AND ORIENTING ELONGATED WORKPIECES

[75] Inventor: Andre Hildenbrand, Richwiller, France

[73] Assignee: Manufacture de Machines du Haut-Rhin "MANURHIN S.A.", Mulhouse, France

[21] Appl. No.: 860,056

[22] Filed: Dec. 13, 1977

[30] Foreign Application Priority Data

Dec. 28, 1976 [FR] France .................... 76 39240

[51] Int. Cl.² ............................ B65G 47/24
[52] U.S. Cl. .................. 198/392; 198/397; 221/169
[58] Field of Search ............ 198/396, 397, 400, 408, 198/392; 221/169, 168, 167, 158, 172

[56] References Cited

U.S. PATENT DOCUMENTS

| 2,754,954 | 7/1956 | Kasper | 198/397 X |
| 3,662,872 | 5/1972 | Nalbach | 198/400 X |
| 3,817,423 | 6/1974 | McKnight | 198/392 |

Primary Examiner—Robert B. Reeves
Assistant Examiner—James L. Rowland

[57] ABSTRACT

There is described a mechanism for feeding and orienting elongated workpieces. The mechanism comprises a hopper which receives the workpieces in bulk, an inclined rotatable plate forming the bottom of the hopper and provided on its periphery with cavities for collecting the workpieces one by one, and a plurality of devices for orienting the workpieces. The orienting devices are fixedly mounted below each cell, such devices each including a closure member operated by a cam which selectively opens the bottom of the cell, and a feeding spout or channel which orients the workpieces in the desired manner as they fall thereinto. The mechanism of the invention may be applied to advantage in the feeding of partially finished workpieces to a machine tool in which they are further shaped or operated upon.

8 Claims, 8 Drawing Figures

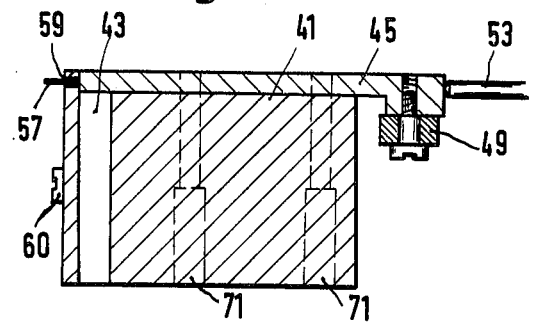
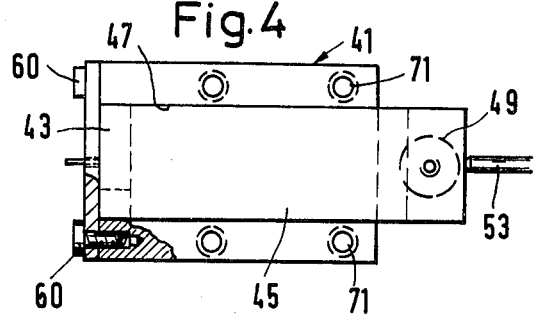
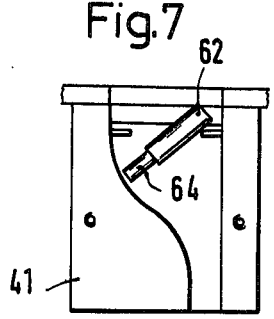
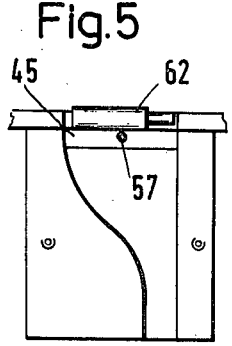
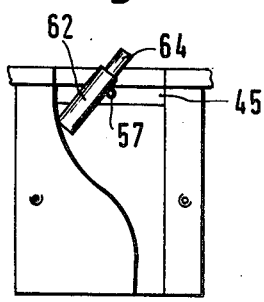
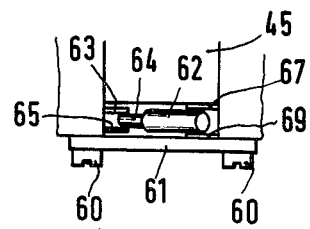

MECHANISM FOR FEEDING AND ORIENTING ELONGATED WORKPIECES

The present invention relates to a mechanism for feeding elongated pieces which are supplied in bulk to a hopper at the entrance of the mechanism, the mechanism delivering the workpieces one by one with a predetermined orientation and at a desired rate.

The invention is particularly applicable to the feeding of empty, partially finished, cartridge cases and for feeding them one by one to a machine tool and the like which further processes the cases. It is to be understood, however, that the mechanism of the invention may be applied for the feeding of particles other than cartridge cases.

Prior mechanisms which include a hopper for the reception of pieces or bodies in bulk, the bottom of the hopper being at least partially formed by an inclined rotatable plate, are known. In such known mechanisms the rotatable plates are provided with cells for gathering the cartridge cases or other workpieces which are supplied thereto in bulk one by one and leading them toward a spout or channel which orients the pieces then, after the pieces have been oriented as desired, feeding them from the mechanism.

The present invention has among its objects the improving of such mechanism so as to increase the speed of distribution of the oriented pieces, such mechanism being operable at varying speeds including slow speeds without any decrease in the reliability of its operation.

A further object of the invention is the elimination of difficulties in controlling the orientation means while making possible a high rate of constant speed filling of the cells on the rotating plate in order to increase the speed of delivery of the oriented pieces.

In order to accomplish the above objects, the present invention provides an improved mechanism of the type including a hopper receiving pieces in bulk, a rotatable inclined plate at the bottom of the hopper provided with cells for the extraction of pieces one by one, the plate being characterized by the fact that it includes a plurality of spouts or channels for orienting the pieces fixed to the turning plate, each such spout or channel being disposed below a respective cell, a camoperated closure member, also fixed to the turning plate, between each cell and the corresponding orienting spout or channel, and a cam system for operating the closure members in such manner as to allow a piece contained in a cell to pass into the corresponding orientation spout, such operation taking place when the rotating cell passes into a predetermined position relative to the hopper.

The orientation spouts or channels are thus disposed below each cell and the closure members form bottoms of such cells when they are in their closed positions. When the closure members open, at a given position of the cell in the course of its rotation in the hopper, the piece contained in the cell falls into the spout where it is oriented and passes toward a means which feeds it from the spout.

Preferably, the closure means and the associated spout or orienting channel form a modular orientation unit which is adapted to be fixed beneath the corresponding cell of the turning plate. The closure member is in the form of a drawer which constitutes the bottom of the cell when it is closed and which forms a part of an orientation means when it is open. For example, the drawer may carry on its end barriers such as rods which are disposed in a certain manner in the spout when the closure member is open, and which serve to orient the pieces which fall therepast.

Further, the hopper for receiving pieces in bulk is provided with one or more guides for recuperating the workpieces and returning them to circulation within the hopper. One or more scrapers, positioned above the path of turning of the cells, bar the passage of a surplussage of pieces to the cells, and direct such surplus pieces toward the recuperation guides.

Such recuperation guides, as a result of their form, return the surplus workpieces into the feeding circuit on the rotating plate with their greater dimension tangent to the path of the cells. One or more flexible tongues disposed downstream of the guides, at the level of the ends of the latter, permit the packing into the cells of the products taken out by the guides.

Other characteristics and advantages of the apparatus of the invention will appear in detail in the following description, reference being made in the attached drawings, in which:

FIG. 3 is a view in vertical section of an orientation module of the mechanism;

FIG. 4 is a view in plan of the module of FIG. 3;

FIG. 5 is a view in vertical section through an orientation module illustrating a first phase of the orientation of a cartridge case which is to be oriented bottom down;

FIG. 6 is a view similar to FIG. 5 illustrating a later phase of the same orienting operation;

FIG. 7 is a view in section through a modified module which orients cartridge cases with their bottom, heavier ends up, the figure showing an intermediate phase of such orienting operation; and FIG. 8 is a fragmentary view in plan of the modified orienting module of FIG. 7.

Figure 1:
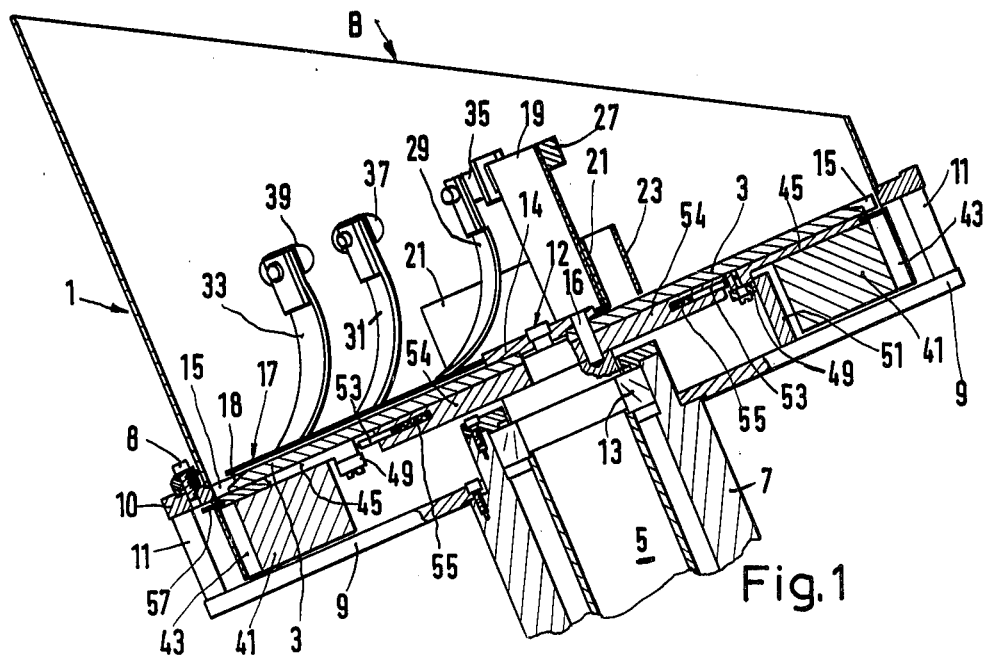
FIG. 1 is a view in vertical section of a preferred embodiment of the invention, the section being taken along the line A—A in FIG. 2.
Figure 2:
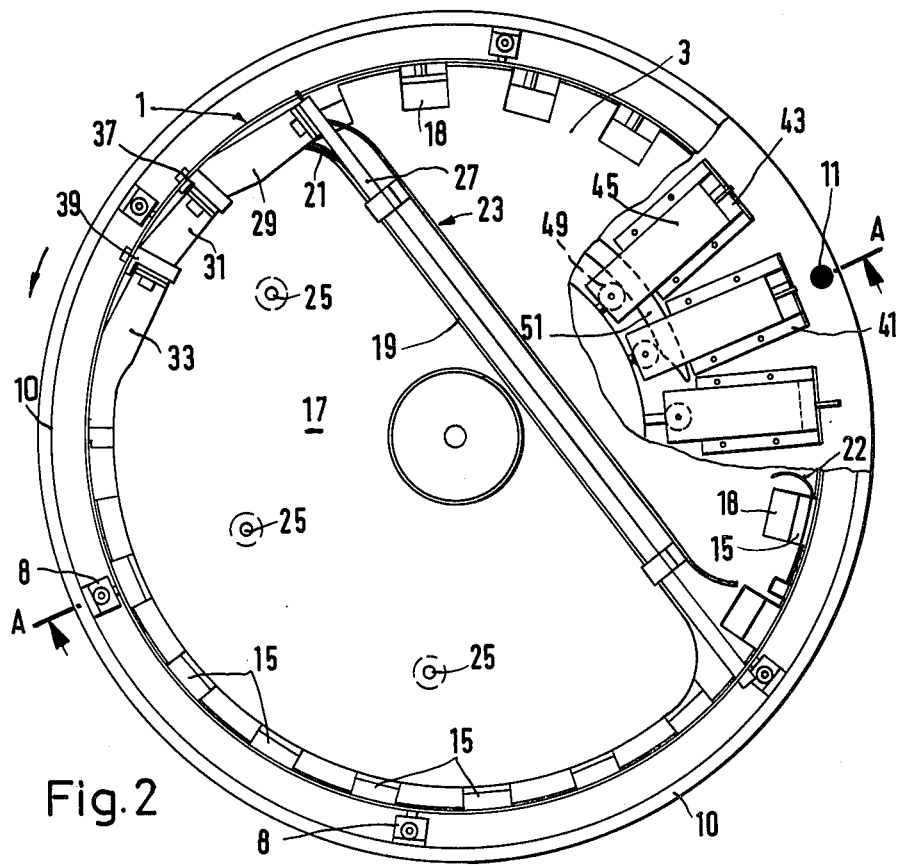
FIG. 2 is a view in plan of the mechanism of the invention, the view being taken in the direction B in FIG. 1, a portion of the rotatable plate of the apparatus being broken away at the right for clarity of illustration.

Turning now to FIGS. 1 and 2, there is shown a distribution mechanism in accordance with the invention. Such mechanism includes a hopper 1 forming a container for receiving partially finished cartridge cases in bulk. The bottom of the hopper is closed by a rotating plate 3 which is inclined with respect to the horizontal in such manner that the cartridge cases accumulate at one side of the hopper (the lower, left-hand side of the hopper in FIGS. 1 and 2).

The plate 3 is mounted in a conventional manner upon a driven shaft 5 which is rotatably mounted in a fixed sleeve 7 to which the hopper is affixed through the intermediary of a base plate 9 secured to the sleeve. The plate 3 rotates counterclockwise as viewed in FIG. 2. The hopper is supported by screw clamps or fittings 8 upon a ring 10 which is carried by columns 11 affixed to the base 9. A roller bearing 13 is provided between the upper end of the shaft 5 and the sleeve 7. The plate 3 is fixed to the shaft 5 by a machine screw 12, a serrated washer 14, and a pin 16. As evident in FIG. 1, the shaft 5 and the sleeve 9 are inclined to the left from the vertical. The lower end of shaft 5 is drivingly connected to rotatable driving means (not shown).

The plate 3 is provided on its periphery, along the interior wall of the hopper 1, with a plurality of cavities 15 which are regularly spaced circumferentially of the plate and extend tangentially thereof. The cells 15 have an elongated form appropriate for the reception of cartridge cases (not shown in FIGS. 1 and 2), and each has a downwardly inclined access ramp 18 extending along its radially inner edge which facilitates, on the one hand, the falling of the cartridge cases to the bottom of the cells and, on the other hand, the clearing of the surplus cartridge cases from the upper ends of the cells.

The plate 3, while turning, collects cartridge cases in the cells from the mass thereof which are gathered at the lowest point in the hopper, that is to say, at the left in FIGS. 1 and 2. The mechanism causes the thus-gathered cartridge cases to be carried by plate 3 to the top of the hopper, up to the place where the pieces are evacuated from the hopper toward the orientation means as will be explained below.

In order to assure a correct rate of replacement of the cartridge cases, so that a maximum number of cells each contain a single cartridge case, the apparatus includes one or more scrapers, one or more guides for the recuperation of the cartridge cases, and tongues which aid the insertion of the cartridge cases into the cells.

A conventional fixedly mounted scraper 22 (FIG. 2) disposed above plate 3 aids in the discharge of excess cartridge cases from the cells; one or more fixed recuperation guides 21 and 23, which return the cartridge cases into the feeding circuit, are mounted above plate 3 and extend perpendicularly to the bottom of the hopper; excess cartridge cases collected by the scraper 22 fall upon the guides 21 and 23 in a quantity sufficiently limited so that the cartridge cases place themselves naturally into a position of stable equilibrium within the angle formed by the guides 21 and 23 and the turning plate 3 (that is to say, with their greatest length parallel to guides 21 and 23). The guides 21 and 23 are affixed to a bar 27 which is fixedly attached to the walls of the hopper and span the hopper from side to side. As shown in FIG. 2, the main, central extents of guides 21 and 23 are straight, and extend chordally across the plate 3 somewhat above the axis of plate 3 and inclined upwardly in the direction from right to left as shown in FIG. 2. Because of the counterclockwise rotation of the plate 3 and the inclination of the guides 21 and 23, the cartridge cases position themselves along the guides and are thereafter gathered towards the bottom of the hopper. The upper ends of guides 21 and 23 are smoothly curved in the direction of rotation of plate 3. The curved form of the extremities of the guides 21 and 23 cause the cartridge cases to turn in such manner to lead them tangentially to the path of travel of the cells 15.

The apparatus is also provided with a plurality of flexible tongues 29, 31, and 33, the upper ends of which are fixedly supported substantially above the plate 3 and the lower portions of which are pulled by the rotation of plate 3 into the configurations shown in FIG. 1. The flexible tongues 29, 31, and 33 aid in the filling of the cells 15 by engaging the products, thrusting them against the turning plate 3 and thus braking them. As shown in FIG. 2, the plates 3 and thus the cells 15 mounted thereon, turn in a counterclockwise direction.

The tongues 29, 31, 33 are fixed at their upper ends to the wall of the hopper through the intermediary of supports which are riveted to the walls 35, 37, 39. The tongue 29 is shown fixed by a support 35 to the bar 27. The other tongues are affixed directly upon the side wall of the hopper. The tongues descend in curving runs toward the trajectory of the cavities 15 on the turning plate 3, and extend along the interior side wall of the hopper in the same direction as the direction of rotation of the plate 3.

A fixed plate 17 coaxial of plate 3 covers the bottom part of the hopper 1 in the portion whereon the cartridge cases to be treated are piled. The diameter of the plate 17 is somewhat less than that of plate 3, so that it does not cover the cavities 15 (FIG. 2). Plate 17 is held somewhat above the turning plate 3 through the intermediary of studs 25 fixedly mounted on plate 3 in such manner as to permit a gliding and gentle rubbing of the plate 3 by the plate 17 while permitting the two plates to lie very close to each other and thus preventing cartridge cases from entering the space between them. The plate 17 is fixed upon a bar 27 through the intermediary of a partition 19 which rises from the plate 17 perpendicular to the plane thereof.

The amount of abrasion which occurs between the cartridge cases and the turning plate 3 is minimized by the substitution for the abrasion of the plate 3 over its whole extent against the cartridge cases, which would take place in the absence of plate 17, by the rubbing of the plate 3 against the upper ends of the studs 25 which form bearings therefor. This decreases the amount of noise which otherwise might be generated during the operation of the mechanism and reduces the amount of power absorbed by the mechanism.

After the cartridge cases have been collected in the cells 15, it is necessary to orient them so that they will lie in a desired direction when they are delivered from the mechanism. This may be done, as will be seen from the following description, so that either the bottom (larger diametered portion) lies downwardly (FIGS. 5 and 6), or the bottom lies upwardly (FIGS. 7 and 8). For this purpose, orienting means are disposed beneath the cells 15 to make the cartridge shells at a given time fall into such cells. Such means includes a canal or channel which narrows in a downward direction to cause the cartridge case to turn from a horizontal position to a vertical position under the influence of gravity; the direction of turning of the cartridge cases (bottom up or bottom down) is determined by a system of baffles disposed in an upper part of the orientation means. The orientation means, which is preferably in modular form with no parts per se which are movable, is affixed to the moving plate 3 below each cavity 15.

Turning now to FIGS. 3 and 4, the orientation means is there shown as a fixed block 41 provided with a channel 43 in the form of a funnel, which is disposed below the corresponding cavity 15. Between the channel 43 and the cavity 15, the orientation means is provided with a drawer 45 which is slidable in a guide 47 in the block 41. The drawer 45 constitutes a closure member for the upper part of the channel. The part 45 also constitutes the bottom of the cell 15, under which the block is fixed, when the member 45 is in its closed position.

When the closure member 45 is closed, a cartridge case disposed within the cavity 15 rests upon it. When the closure means 45 is open, the cartridge case falls down within the channel 43.

The closure member 45 is cam operated. As most clearly shown in FIGS. 3 and 4, a roller 49 is pivotally attached to member 45. As shown in FIGS. 1 and 2, there is provided a cam 51 supported on fixed structures, the configuration of the cam 51 conforming to the manner of operating the closure member 45 into its open position when the roller 49, driven by the rotation of the rotating plate 3, engages the cam, which is located in the upper part of the inclined bottom 3 of the hopper. For the remainder of the time, the closure member 45 is retracted into closed position by a plunger 53 which is constantly urged outwardly by coil compression springs 55 disposed in a block 54 affixed to the plate 3. A plunger and a spring are provided for each roller 49, that is to say, for each orientation module fixed beneath the plate 3.

It is to be understood that in the case of workpieces having small dimensions one may operate a plurality of closure members 45 by a single roller or have a modular orientation means carrying a number of orientation channels associated with an equal number of cavities 15.

The modular orientation means with closure means incorporated therein at a given time in the rotation of the plate 3 and thus of each cavity 15, cause the opening of the bottom of the cavity and the transfer of a cartridge case into the orientation channel where it is changed from a position in which its longitudinal axis lies parallel to the plane of the plate 3 to a position in which such longitudinal axis lies perpendicular with respect to such plane. As above-indicated, such orientation of the cartridges or the workpieces may be in such manner as to determine the chosen direction of fall for each cartridge case (bottom down or bottom up).

The orientation channel is provided with baffle rods which determine the direction of turning of the pieces during their fall. In the embodiment shown in FIGS. 1–6, inclusive, the cartridge case falls so that its bottom is disposed downwardly. To accomplish this result, there is provided a baffle rod 57 in the middle of the orientation channel at the upper part thereof. In falling, the cartridge case knocks against rod 57 and turns in such direction that its center of gravity pivots about the rod 57 (bottom downwardly if the bottom of the cartridge case is heavier).

In the preferred illustrative example, the rod 57 is carried by the closure member 45 at its extremity and the rod is positioned in place under the cartridge at the same time when the closure member 45 opens.

The external wall 61 of the channel 43, which closes the latter and at the same time limits the displacement of the closure means 45 during its closing, is by preference made of transparent plastic material in order to make the falling of the cartridge cases visible and so that their final orientation can be observed. Wall 61 is pierced by an opening 59 which allows the rod 57 to pass therethrough when the closure means 45 is closed. The rod 57 is attached to the front of the block 41 by screws 60. In FIGS. 5 and 6, the cartridge case 62 there shown falls with its bottom downwardly by reason of rod 57.

In another embodiment of the modular orientation block, it is desired that cartridges 62 shall fall with their smaller diametered part 64 at the bottom. For this purpose there is provided another system of baffles, shown in FIGS. 7 and 8, which may be affixed to the end of the closure means 45, or as shown in FIGS. 7 and 8 make a part of block 41 itself at the level of the upper part of the orientation channel.

This system of baffles employs two short parallel rods 63, 65 on the one hand and 67, 69 on the other hand, at each side of the orientation channel, such sets of rods being spaced from each other in such manner that the narrow part of the cartridge case can pass between them but not the rest of the cartridge case. The space between the two groups of parallel rods is such that the cartridge case can pass them in a vertical position but not enough that the larger part of the cartridge case can pass through them in a horizontal position. FIGS. 7 and 8 shown the turning movement of the cartridge case with such arrangement of baffling rods.

The cartridge cases are thus definitely oriented in the modular orientation blocks which are affixed under each cavity, and in such construction one may note that the modular blocks which orient the cartridge cases with the bottoms up may be easily replaced by other modular blocks which orient the cartridge cases with the bottoms down, or that the two types of blocks may be intermixed around the rotatable plates 3. The affixing of the blocks by screws 71 under the plate 3 permit a rapid change of orientation of the workpieces according to a desired distribution.

The cartridge cases which have been oriented travel to the bottom of the orientation channel in a vertical position. The bottoms of the channels are open and the cartridge cases rest upon the plate 9 which forms a fixed base or bottom of the hopper.

The plate 9 is provided at one chosen location with an opening (not shown) through which the cartridge cases may leave the orientation channels and fall into a discharge means therefor (also not shown) which function to transfer the oriented cartridge cases, for example, toward a machine tool which performs one or more further operations upon them. Such transfer mechanism may be, for example, a transfer wheel the rotation of which is synchronized with the turning of the rotatable plate 3.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. In a mechanism for automatically feeding elongated pieces such as cartridge cases, such mechanism orienting the pieces for feeding, for example, to a machine tool, said mechanism including a hopper for the reception of pieces in bulk, and an inclined plate turning at the bottom of the hopper, said inclined plate being provided with cavities to be filled by the pieces one by one, the improvement which comprises means providing a plurality of channels for the orientation of the pieces, said channel providing means being affixed to the turning plate, each below a respective cavity, a cam-operated closure means, also fixed to the turning plate, disposed between each cavity and the corresponding orientation channel, and a cam system for operating the closure means in such manner as to allow a piece contained in a cavity to pass into the corresponding orientation channel when the respective cavity has turned to pass into a predetermined region of the hopper.

2. Mechanism according to claim 1, wherein each orientation channel forms with its associated closure means a modular orientation mechanism affixed in an immovable manner to the turning plate below a respective cavity of the latter.

3. Mechanism according to claim 2, wherein the closure means are constituted by drawers which are selectively interposable between the cavities and the orientation channels, and provided with a roller which selectively engages a cam which is fixed with respect to the hopper.

4. Mechanism according to claim 3, wherein the orientation means has in the upper part of the orientation channel a system of baffle rods, such rods functioning to orient the elongated pieces into a desired angular position.

5. Mechanism according to claim 4, each drawer carries at its end a baffle rod extending across the cavity perpendicular to the longitudinal axis of the cavity.

6. Mechanism according to claim 4, for the orientation of the pieces with a smaller end part downwardly, wherein the orientation channel is provided in its upper end with two groups of parallel baffle rods disposed respectively at opposite ends of the upper part of the orientation channel, the rods of each group being spaced in such manner that only a smaller diametered part at the extremity of the pieces contained in the cavities can pass between them, and the groups being sufficiently close to each other so that the piece falling in the orientation channel cannot pass between the groups in a horizontal position but only in an oblique position at the time that the smaller-diametered position of the piece has passed between the rods of one of said sets of rods.

7. Mechanism according to claim 1, comprising at least one scraper placed above the path of the cavities in order to collect surplus pieces in the cavities, and guides to redirect the thus scraped and collected surplus pieces toward and tangentially of the circular path of the cavities.

8. Mechanism according to claim 1, comprising flexible tongues fixed to the interior periphery of the hopper and inclined downwardly toward the path of the cavities in order to press the pieces downwardly toward the cavities and thus to facilitate their insertion into the cavities.

* * * * *